United States Patent
Bendak et al.

(10) Patent No.: US 6,882,644 B1
(45) Date of Patent: Apr. 19, 2005

(54) SYSTEM AND METHOD FOR DIAGNOSTIC MULTICAST SWITCHING

(75) Inventors: George Beshara Bendak, San Diego, CA (US); Alan Michael Sorgi, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 851 days.

(21) Appl. No.: 09/753,184

(22) Filed: Jan. 2, 2001

(51) Int. Cl.⁷ .............................................. H04L 12/28
(52) U.S. Cl. ...................................... 370/390; 370/474
(58) Field of Search ................................. 370/351–353, 370/389, 390, 391.5, 395.5, 400–403, 419, 458, 463, 474, 466, 391–395, 414; 398/43–56, 67–68, 135–136

(56) References Cited

U.S. PATENT DOCUMENTS

| | | |
|---|---|---|
| 5,251,205 A | 10/1993 | Callon et al. |
| 5,490,252 A | 2/1996 | Macera et al. |
| 5,568,471 A | 10/1996 | Hershey et al. |
| 5,661,763 A | 8/1997 | Sands |
| 5,666,108 A | 9/1997 | Duffy |
| 5,778,000 A | 7/1998 | Dosiere et al. |
| 5,793,976 A | 8/1998 | Chen et al. |
| 5,854,699 A | 12/1998 | Olshansky |
| 5,875,396 A | 2/1999 | Stockton et al. |
| 5,982,743 A | 11/1999 | Kusano |
| 6,006,069 A | 12/1999 | Langston |
| 6,426,815 B1 * | 7/2002 | Koehler ........................ 398/59 |
| 6,529,303 B1 * | 3/2003 | Rowan et al. ................ 398/82 |
| 6,671,271 B1 * | 12/2003 | Takemura et al. .......... 370/352 |
| 2002/0053062 A1 * | 5/2002 | Szymanski .................. 714/801 |
| 2003/0147585 A1 * | 8/2003 | Kikuchi et al. ............... 385/24 |

* cited by examiner

*Primary Examiner*—David Vincent
(74) *Attorney, Agent, or Firm*—Incaplaw; Terrance A. Meador

(57) ABSTRACT

An integrated circuit relay device and switching method are presented that permit communications to be routed in a variety of patterns so that diagnostic procedures can be performed in situ, to evaluate digital wrapper communication links. The relay has a pair of inputs, a pair of outputs, a decoder, and an encoder. The relay is programmable to operate in a variety of modes, so that communications can be passed between any set of ports, with or without encoding and decoding processes. The flexible relay routing permits either test signals or normal communications to conducted through the device.

38 Claims, 15 Drawing Sheets

US 6,882,644 B1

SYSTEM AND METHOD FOR DIAGNOSTIC MULTICAST SWITCHING

RELATED APPLICATIONS

This application contains material related to the following commonly assigned U.S. Patent Applications incorporated herein by reference:

Ser. No. 09/753,185, filed Jan. 2, 2001 for "SYSTEM AND METHOD FOR REDUNDANT PATH CONNECTIONS IN DIGITAL COMMUNICATIONS NETWORK".

Ser. No. 09/753,183, filed Jan. 2, 2001 for "BIDIRECTIONAL LINE SWITCH RING SYSTEM AND METHOD".

BACKGROUND OF THE INVENTION

1. Field of the Invention

This inventions relates generally to digitally wrapped communications and, more particularly, a system and method for selectively directing and controlling communications to, and from, an integrated circuit (IC) relay.

2. Description of the Related Art

FIG. 1a is a schematic block diagram of a bidirectional line switch ring (prior art). Communication networks often connect nodes with bidirectional communications, to form a ring of nodes. One well-known example is the synchronous optical network (SONET). Bidirectional line switch rings are a method of SONET transport where part of the communications are sent clockwise over a first fiber and the rest of the communications are sent counter-clockwise over a second fiber.

FIG. 1b is a schematic block diagram of FIG. 1a where the ring has been broken due to a faulty fiber or broken node (prior art). Protection fibers 10 and 12 are shown that heal the ring by permitting communications to travel around the ring in the opposite direction.

Protection fiber systems can be enabled in software, however, the solution is complex and requires a complete knowledge of the network fiber system before installation. Alternately, redundant nodes can be provided in the network. However, the hardware can be expensive. Further, the solutions must be done at the box or system level. This type of redundancy can be a problem where space and power consumption are concerns. There is no standard practice redundancy practice in the implementation of BLSR networks.

Of course, not all bidirectional communication systems are configured as rings. Regardless of configuration, however, testing and link diagnostic procedures are required when communications become degraded. The troubleshooting communications links is often a cumbersome task. Typically, normal communication must be interrupted and test equipment must be inserted into the link, sometimes in two locations. Then, diagnostic programs are run to test the link. These test methods are intrusive and disruptive to normal operations. Further, these procedures require special equipment set up and the attention of personnel, making it difficult to immediately react to problems in the link. All the above-mentioned problems are compounded by the fact that communication node relays are typically enabled on printed circuit boards with a limited number of access points.

It would be advantageous if a communication link could be tested without inserting diagnostic test equipment into the link.

It would be advantageous if the relay nodes in a communications link were equipped with functions to enable diagnostic testing.

It would be advantageous if the communication flow and processes through the relay could be simply modified for testing purposes.

Further, it would be advantageous if communication relay node diagnostic testing could be enabled through a programmable node interface.

SUMMARY OF THE INVENTION

This invention is an IC relay device system that makes use of programmable features to set the active data paths through the device and to monitor the possible data paths for integrity. In addition to this, it is possible to connect any input data path to any output data path while bypassing, or not, the internal circuitry. In this manner, network diagnostics and board level debug operations are made possible. More specifically, the invention has two inputs and outputs, as well as two main blocks within the device, one for encoding and one for decoding. The input, output, and block connections are programmable. The programmable features permit communication to be selectively routed and selectively operated upon. Thus, the normal communication flow can be redirected for diagnostic purposes, and returned to normal operation with simple program instructions.

A diagnostic multicast (one to many) crossbar switching method is also provided for use in an IC digital communication relay device. The method comprises: establishing a first and second input path to receive communications; establishing a first and second output path to supply communications; selectively passing communications from the first input to the first and second outputs; selectively passing communications from the second input to the first and second outputs; selectively decoding received communications; and, selectively encoding supplied communications. Additional details of the IC relay device and method of the present invention are presented below.

DETAILED DESCRIPTION OF THE PREFERRED EMBODIMENTS

Figure 1B:
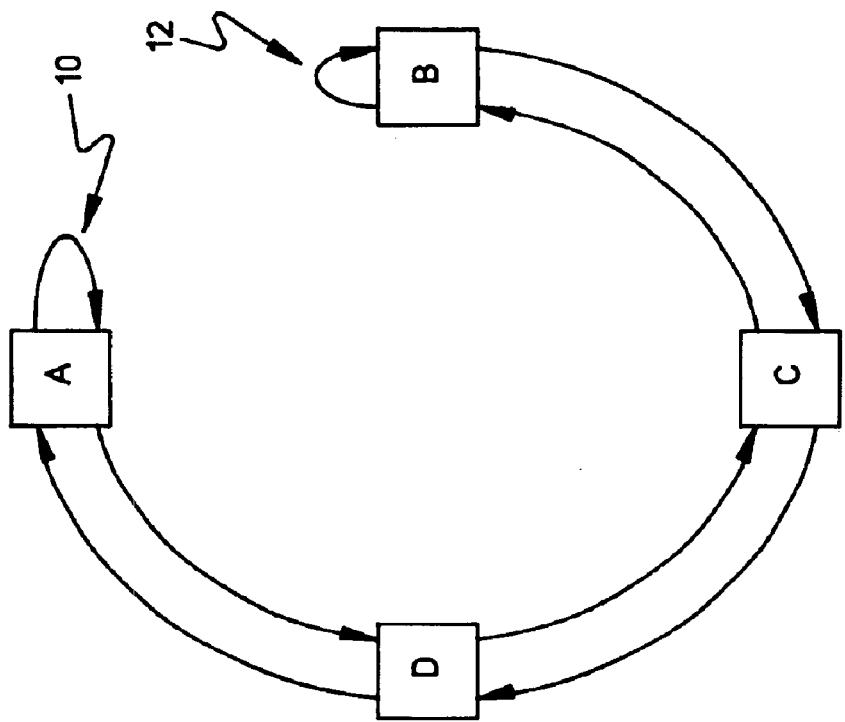
FIG. 1b is a schematic block diagram of FIG. 1a where the ring has been broken due to a faulty fiber or broken node (prior art).
Figure 1A:
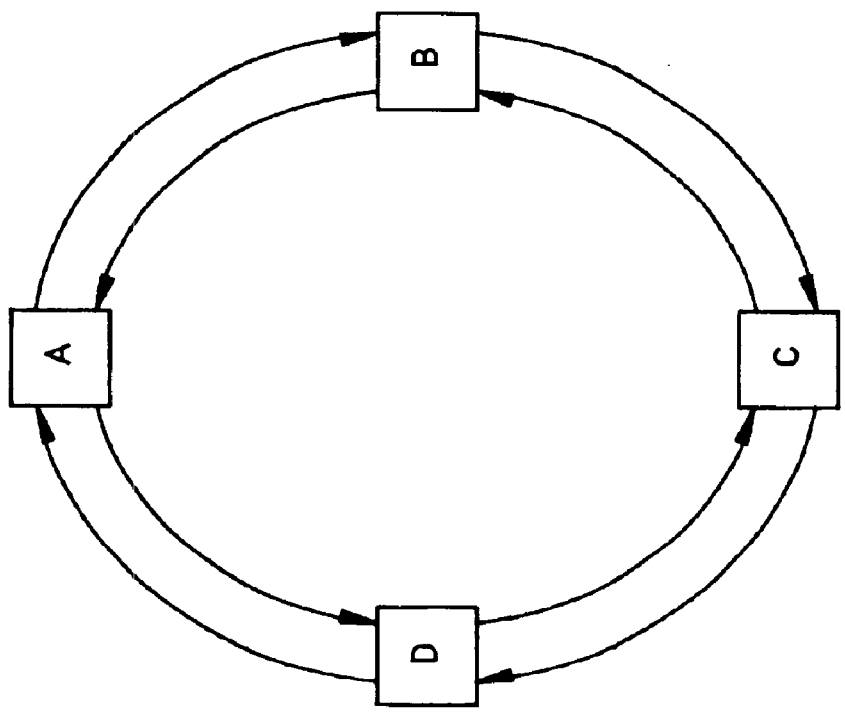
FIG. 1a is a schematic block diagram of a bidirectional line switch ring (prior art).
Figure 2:
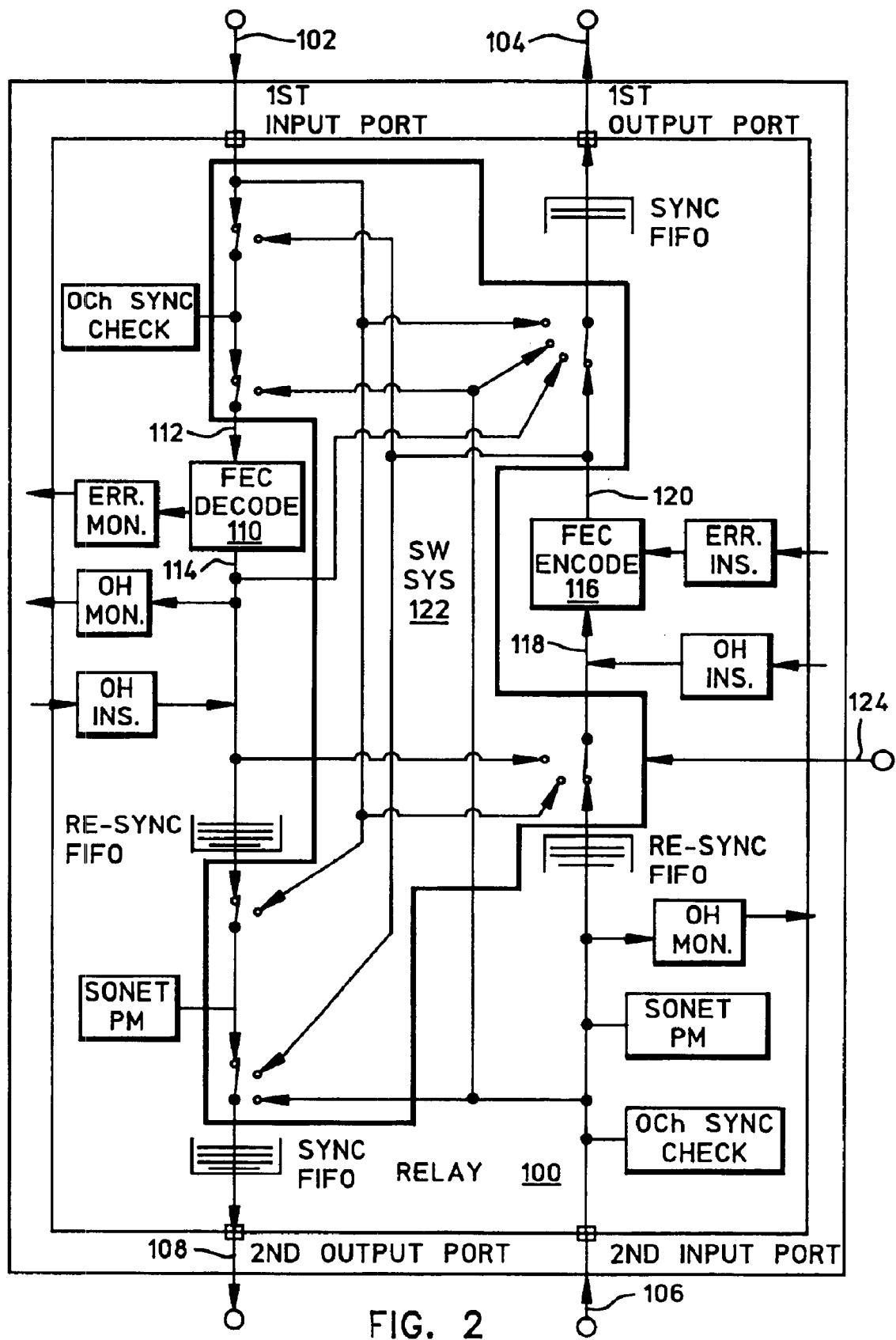
FIG. 2 is a detailed schematic block diagram of the present invention IC digital communications relay device.

FIG. 2 is a detailed schematic block diagram of the present invention IC digital communications relay device to enable diagnostic multicast switching. The figure illustrates the available connections within the device. Connections can be made for the redundant configurations and for many different loopbacks to aid in diagnosing connectivity within the network.

The relay device 100 comprises a first input port on line 102, a first output port on line 104, a second input port on line 106, and a second output port on line 108. Also included is a decoder 110 having an input on line 112 to accept communications. The decoder 110 has an output on line 114 to supply decoded and corrected communications. An encoder 116 has an input on line 118 and an output on line 120 to supply encoded communications. In the simplest form, the encoding and decoding operations are parity data. Alternately, the communications are encoded and decoded with forward error correction (FEC), such as the Reed-Solomon (RS) algorithm, or the equivalent.

A switch system 122 has an input on line 124 to accept switching commands for selectively connecting the input ports 102/106, output ports 104/108, decoder 110, and encoder 116. Although not explicitly shown, the various switch points inside the switch system 122 are all controlled by commands accepted on line 124.

Figure 3:
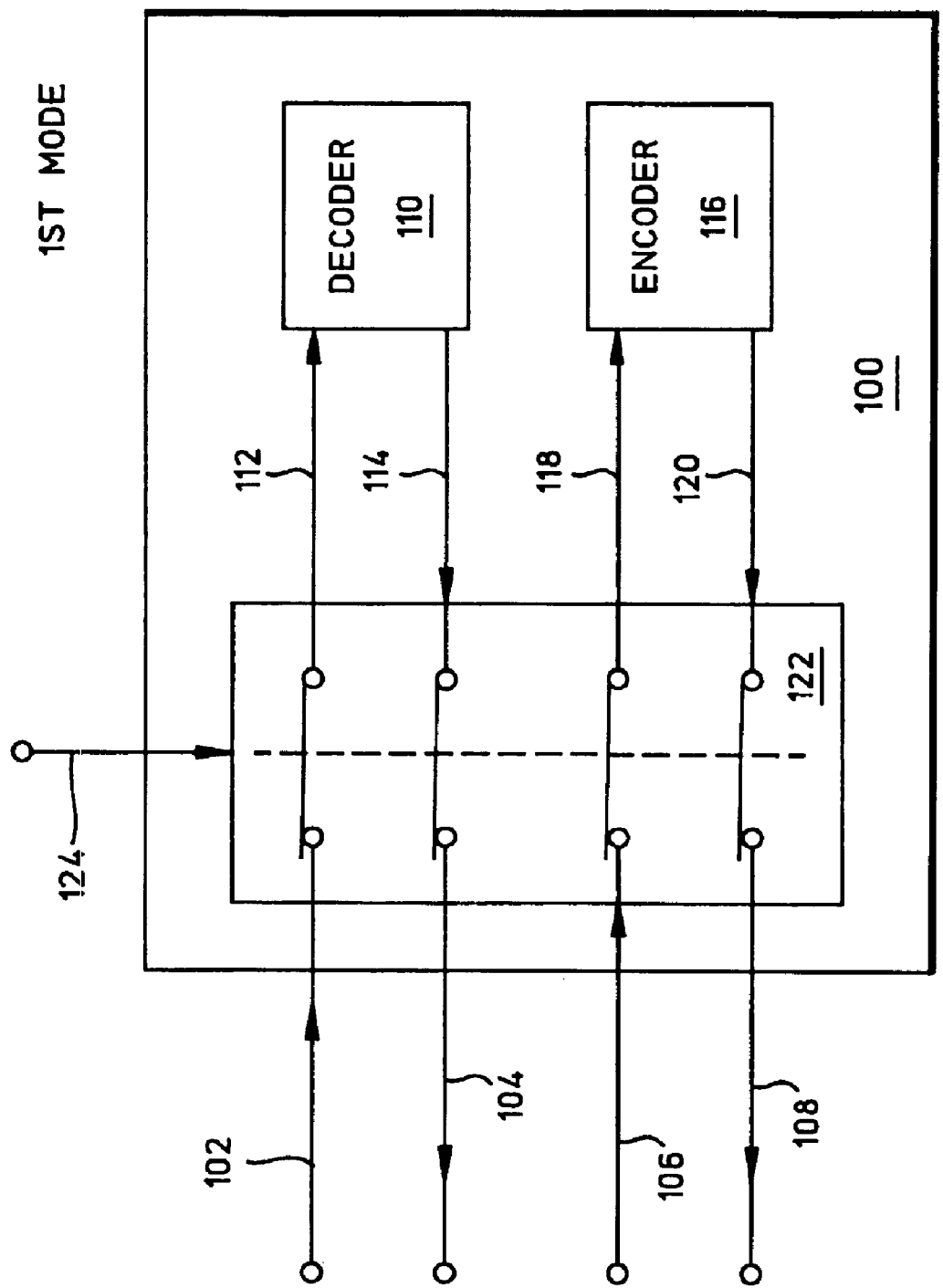
FIG. 3 is a simplified depiction of FIG. 2 featuring a specific implementation of the relay device.

FIG. 3 is a simplified depiction of FIG. 2 featuring a specific implementation of the relay device 100. In some aspects of the invention, the switch system 122 accepts a first mode command on line 124 and in response connects the first input port on line 102 to the decoder input on line 112. The decoder output on line 114 is connected to the first output port on line 104. In addition, the switch system 110 connects the second input port on line 106 to the encoder input on line 118, and the encoder output on line 120 to the second output port on line 108. This first mode of operation is a typical operating mode.

Figure 4:
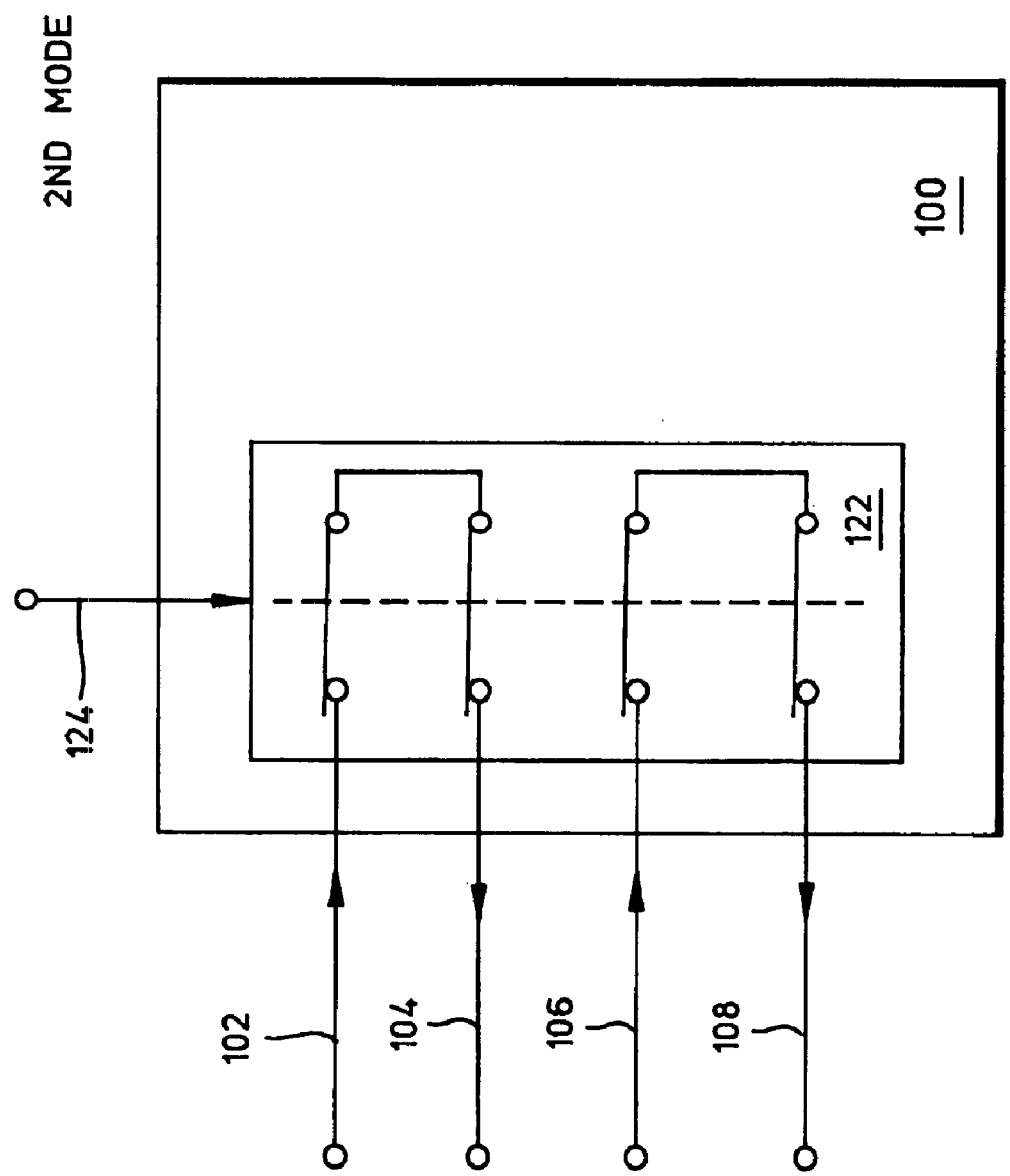
FIG. 4 is a simplified depiction of FIG. 2 featuring the second mode of relay device operation.

FIG. 4 is a simplified depiction of FIG. 2 featuring the second mode of relay device 100 operation. The switch system 122 accepts the second mode command on line 124 and in response connects the first input port on line 102 to the first output port on line 104. The switch system 122 also connects the second input port on line 106 to the second output port on line 108.

Figure 5:
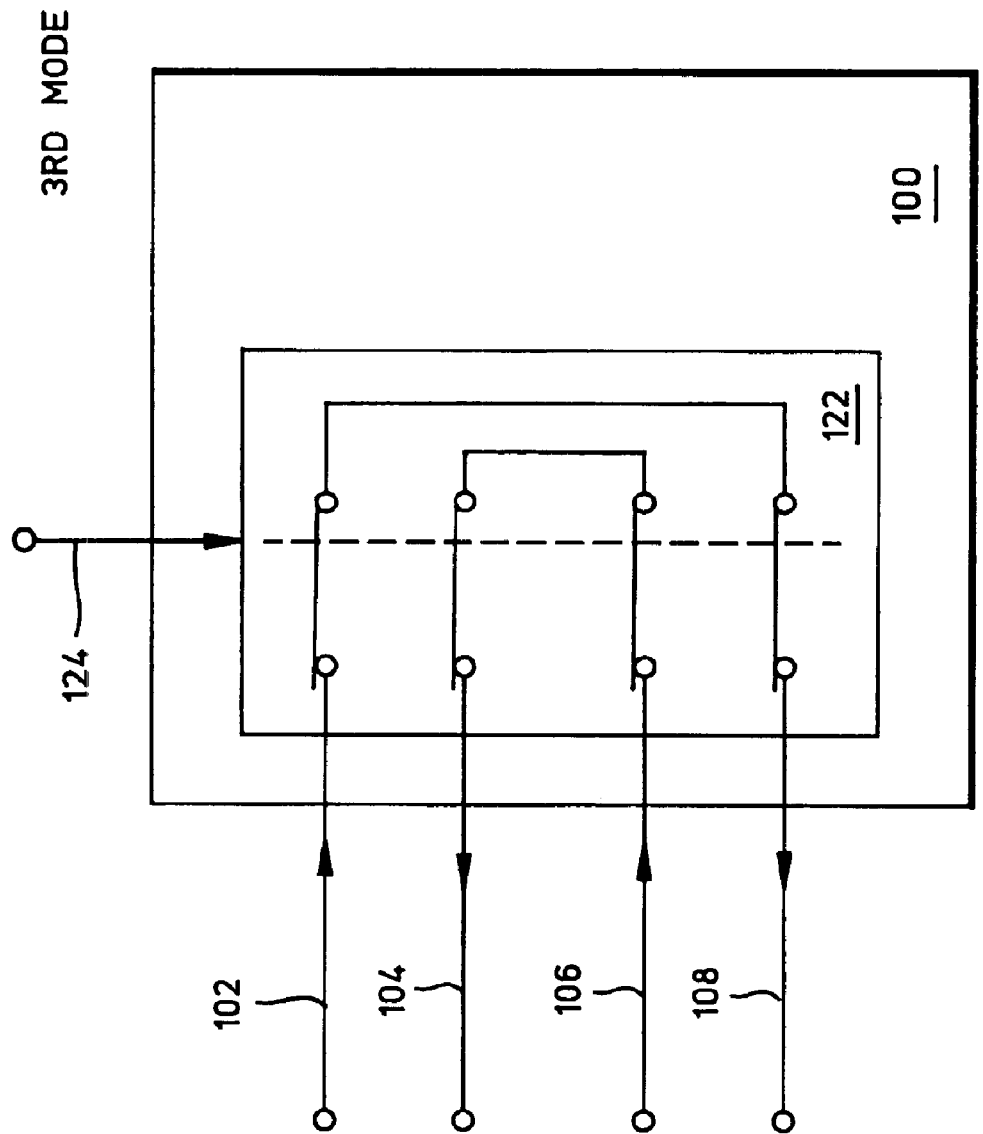
FIG. 5 is a simplified depiction of FIG. 2 featuring the third mode of relay device operation.

FIG. 5 is a simplified depiction of FIG. 2 featuring the third mode of relay device 100 operation. The switch system 122 accepts the is third mode command on line 124 and in response connects the first input port on line 102 to the second output port on line 108. The switch system 122 also connects the second input port on line 106 to the first output port on line 104.

Figure 6:
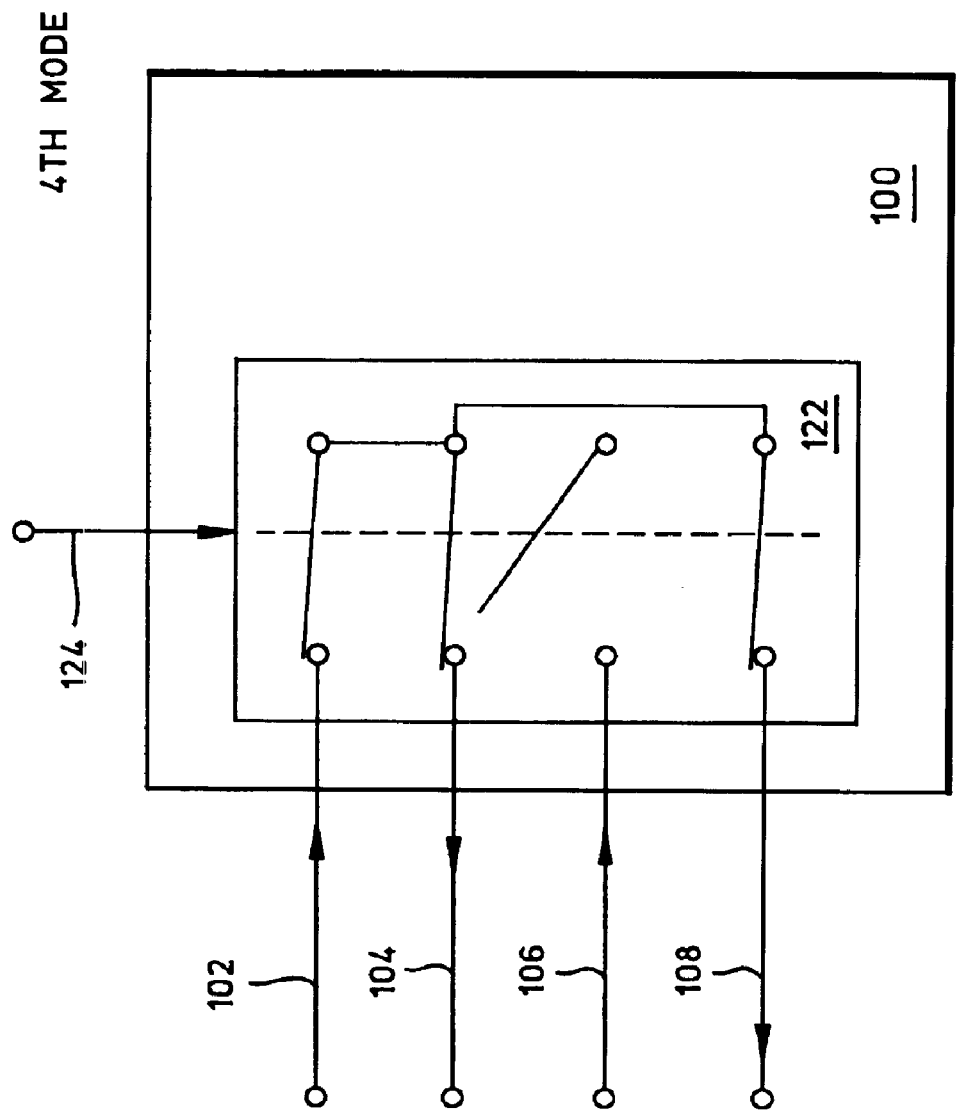
FIG. 6 is a simplified depiction of FIG. 2 featuring the fourth mode of relay device operation.

FIG. 6 is a simplified depiction of FIG. 2 featuring the fourth mode of relay device 100 operation. The switch system 122 accepts the fourth mode command on line 124 and in response connects the first input port on line 102 to the second output port on line 108 and to the first output port on line 104.

Figure 7:
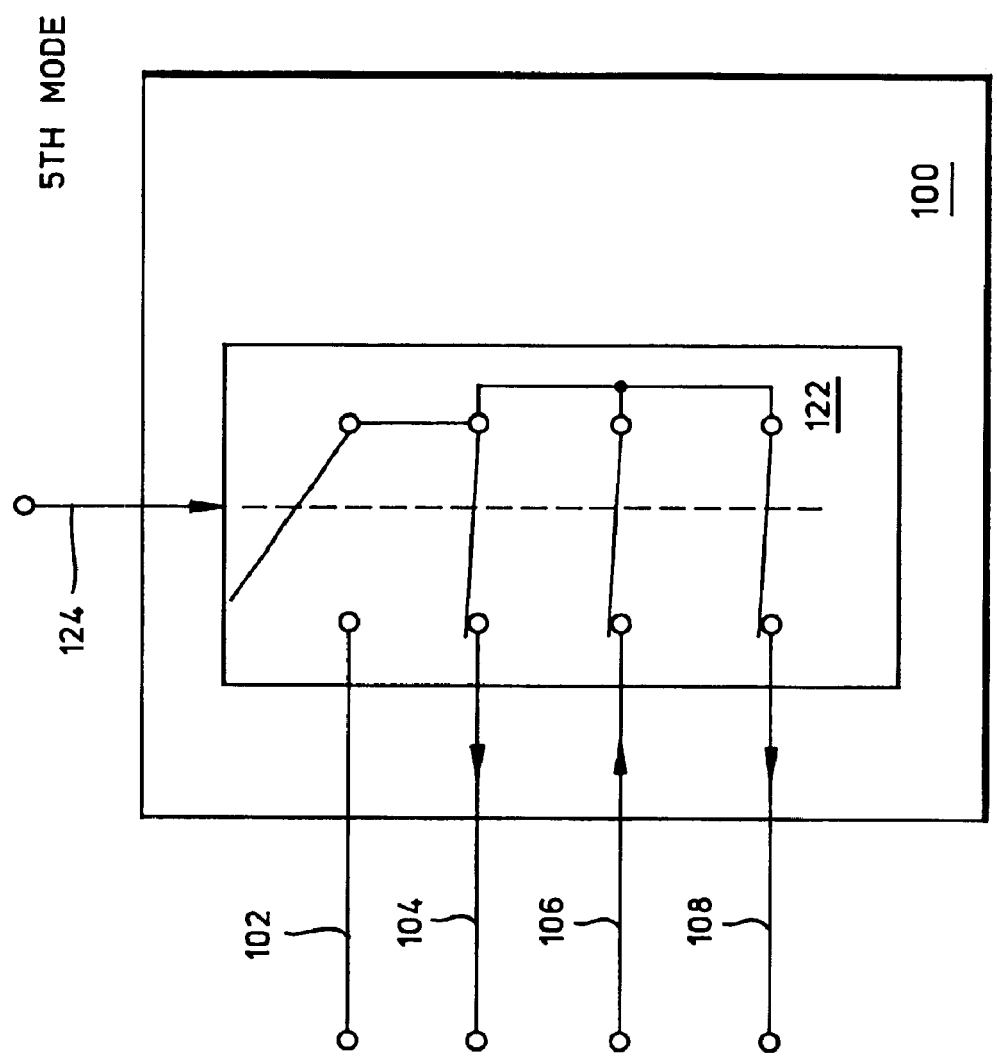
FIG. 7 is a simplified depiction of FIG. 2 featuring the fifth mode of relay device operation.

FIG. 7 is a simplified depiction of FIG. 2 featuring the fifth mode of relay device 100 operation. The switch system 122 accepts the fifth mode command on line 124 and in response connects the second input port on line 106 to the second output port on line 108 and to the first output port on line 104.

Figure 8:
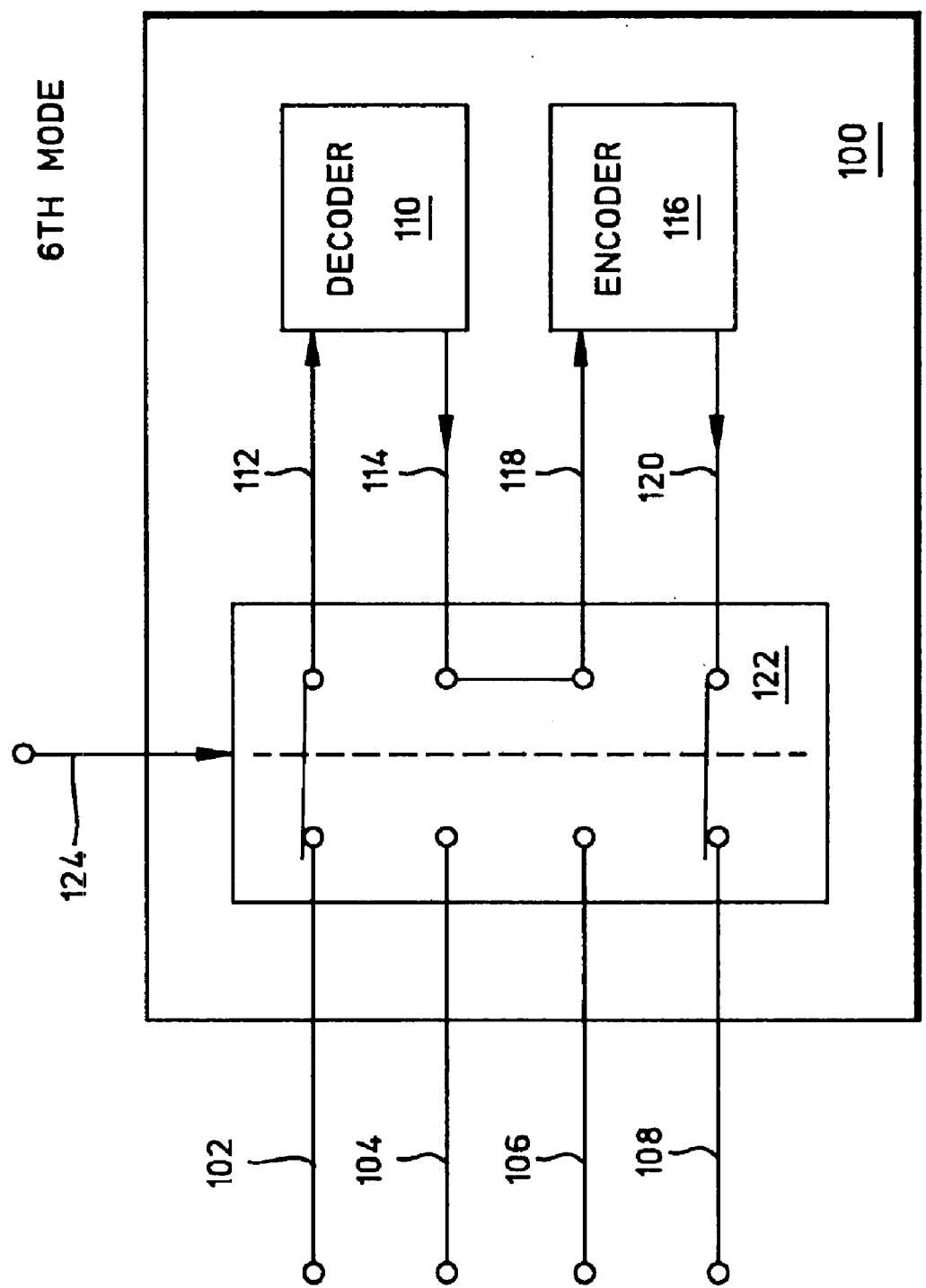
FIG. 8 is a simplified depiction of FIG. 2 featuring the sixth mode of relay device operation.

FIG. 8 is a simplified depiction of FIG. 2 featuring the sixth mode of relay device 100 operation. The switch system 122 accepts the sixth mode command on line 124 and in response connects the first input port on line 102 to the decoder input on line 112. The switch system 122 connects the decoder output on line 114 to the encoder input on line 188. Also, the encoder output on line 120 is connected to the second output port on line 108.

Figure 9:
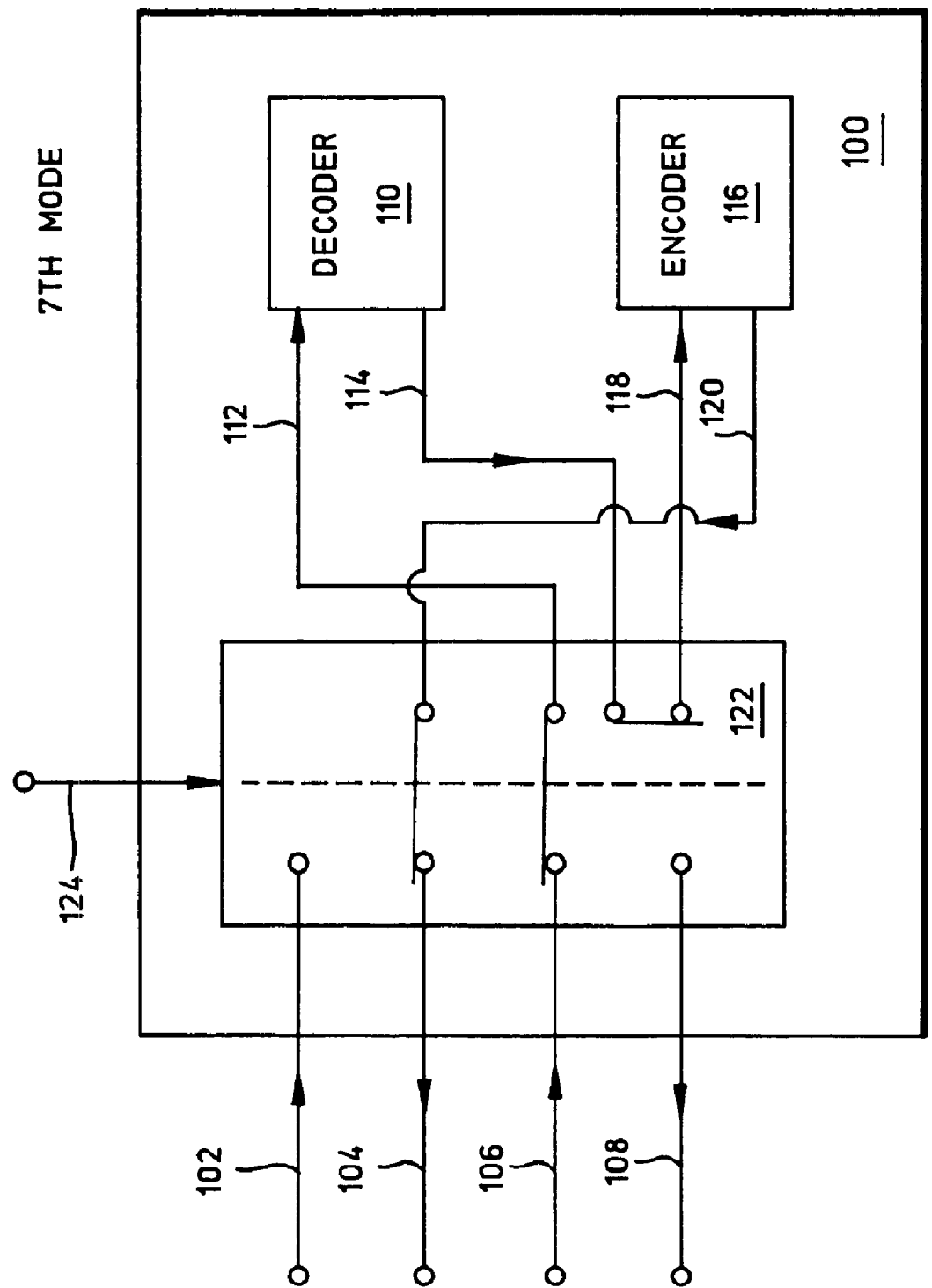
FIG. 9 is a simplified depiction of FIG. 2 featuring the seventh mode of relay device operation.

FIG. 9 is a simplified depiction of FIG. 2 featuring the seventh mode of relay device 100 operation. The switch system 122 accepts the seventh mode command on line 124 and in response connects the second input port on line 106 to the decoder input on line 112. The switch system 122 connects the decoder output on line 114 to the encoder input on line 118. Also, the encoder output on line 120 is connected to the first output port on line 104.

Figure 10:
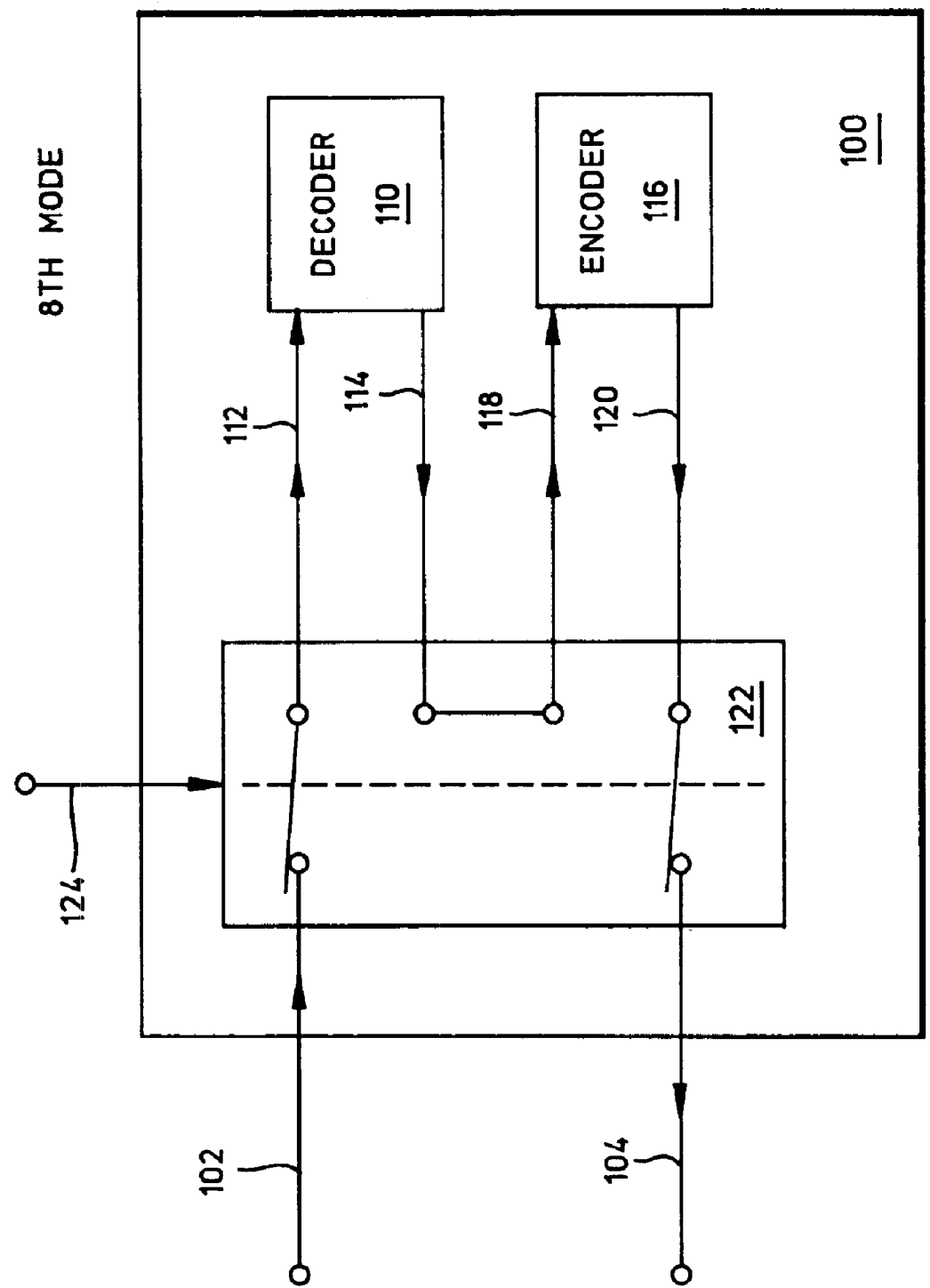
FIG. 10 is a simplified depiction of FIG. 2 featuring the eighth mode of relay device operation.

FIG. 10 is a simplified depiction of FIG. 2 featuring an eighth mode of relay device 100 operation. The switch system 122 accepts the eighth mode command on line 124 and in response connects the first input port on line 102 to the decoder input on line 112. The switch system 122 connects the decoder output on line 114 to the encoder input on line 118. Also, the encoder output on line 120 is connected to the first output port on line 104. A ninth mode not shown would be similar to the eighth mode, except that the decoder input is connected to the second input 106 and the encoder output connected to the second output on line 108.

Figure 11:
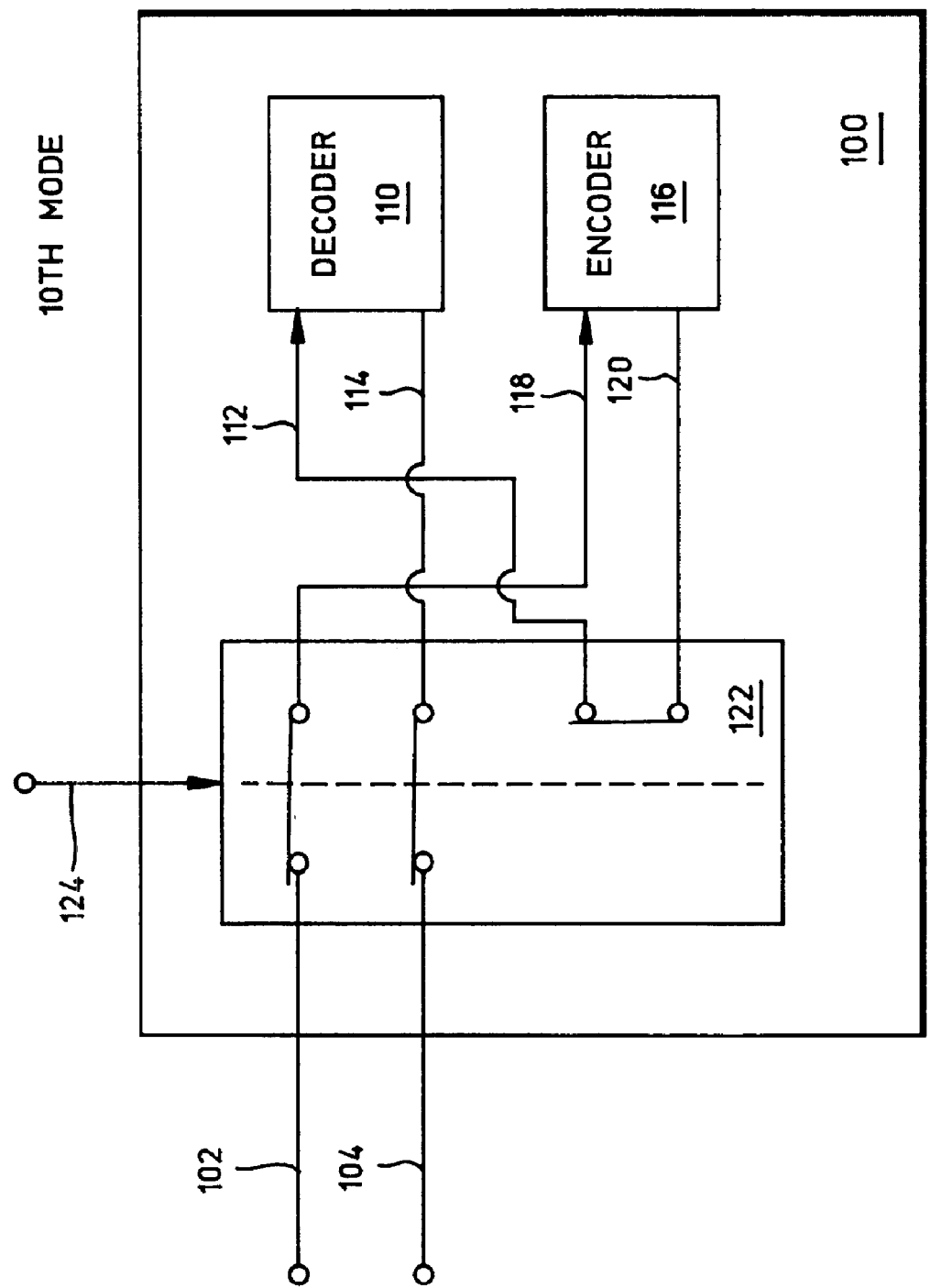
FIG. 11 is a simplified depiction of FIG. 2 featuring the tenth mode of relay device operation.

FIG. 11 is a simplified depiction of FIG. 2 featuring the tenth mode of relay device 100 operation. The switch system 122 accepts the tenth mode command on line 124 and in response connects the first input port on line 102 to the encoder input on line 118. The switch system 122 connects the encoder output on line 120 to the decoder input on line 112. The decoder output on line 114 is connected to the first output port on line 104. An eleventh mode not shown would be similar to the tenth mode, except that the encoder input is connected to the second input 106 and the decoder output connected to the second output on line 108.

Figure 12:
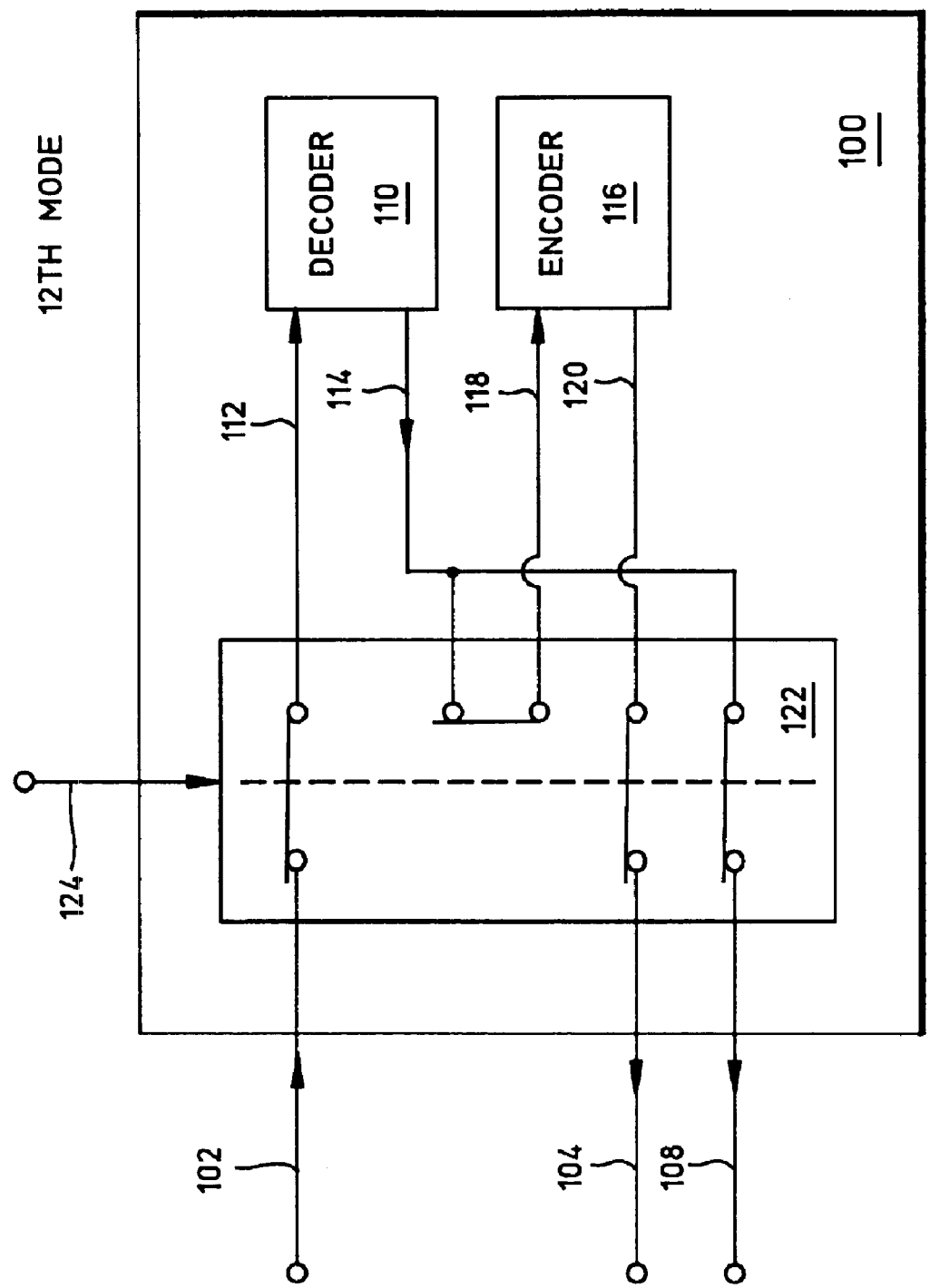
FIG. 12 is a simplified depiction of FIG. 2 featuring the twelfth mode of relay device operation.

FIG. 12 is a simplified depiction of FIG. 2 featuring the twelfth mode of relay device 100 operation. The switch system 122 accepts the twelfth mode command on line 124 and in response connects the first input port on line 102 to the decoder input on line 112. The switch system 122 connects the decoder output on line 114 to the encoder input on line 118 and the second output on line 108. The encoder output on line 120 is connected to the first output port on line 104.

Figure 13:
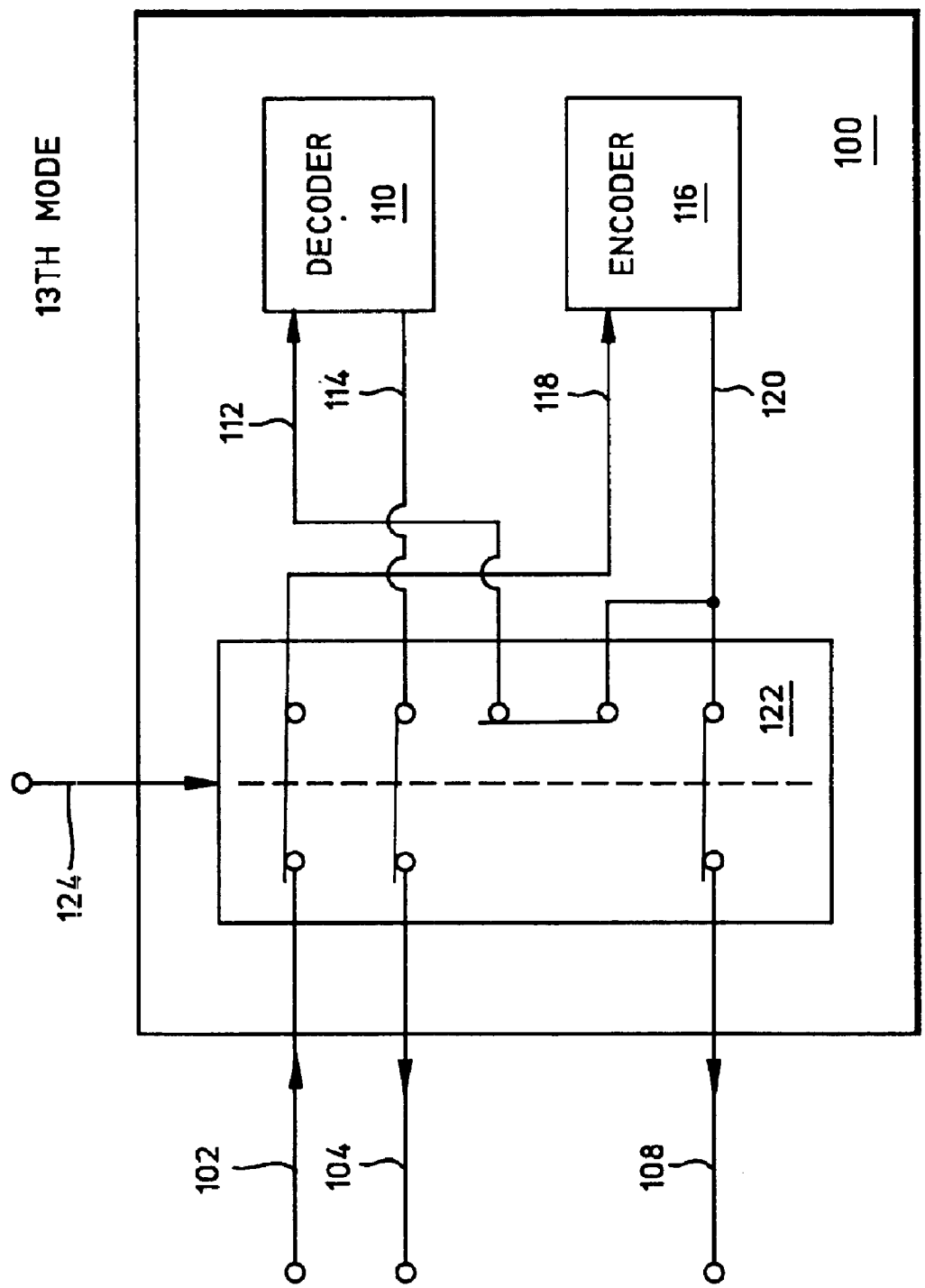
FIG. 13 is a simplified depiction of FIG. 2 featuring the thirteenth mode of relay device operation.

FIG. 13 is a simplified depiction of FIG. 2 featuring the thirteenth mode of relay device 100 operation. The switch system 122 accepts the thirteenth mode command on line 124 and in response connects the first input port on line 102 to the encoder input on line 118. The switch system 122 connects the encoder output on line 120 to the decoder input on line 112 and the second output on line 108. The decoder output on line 114 is connected to the first output port on line 104.

Figure 14:
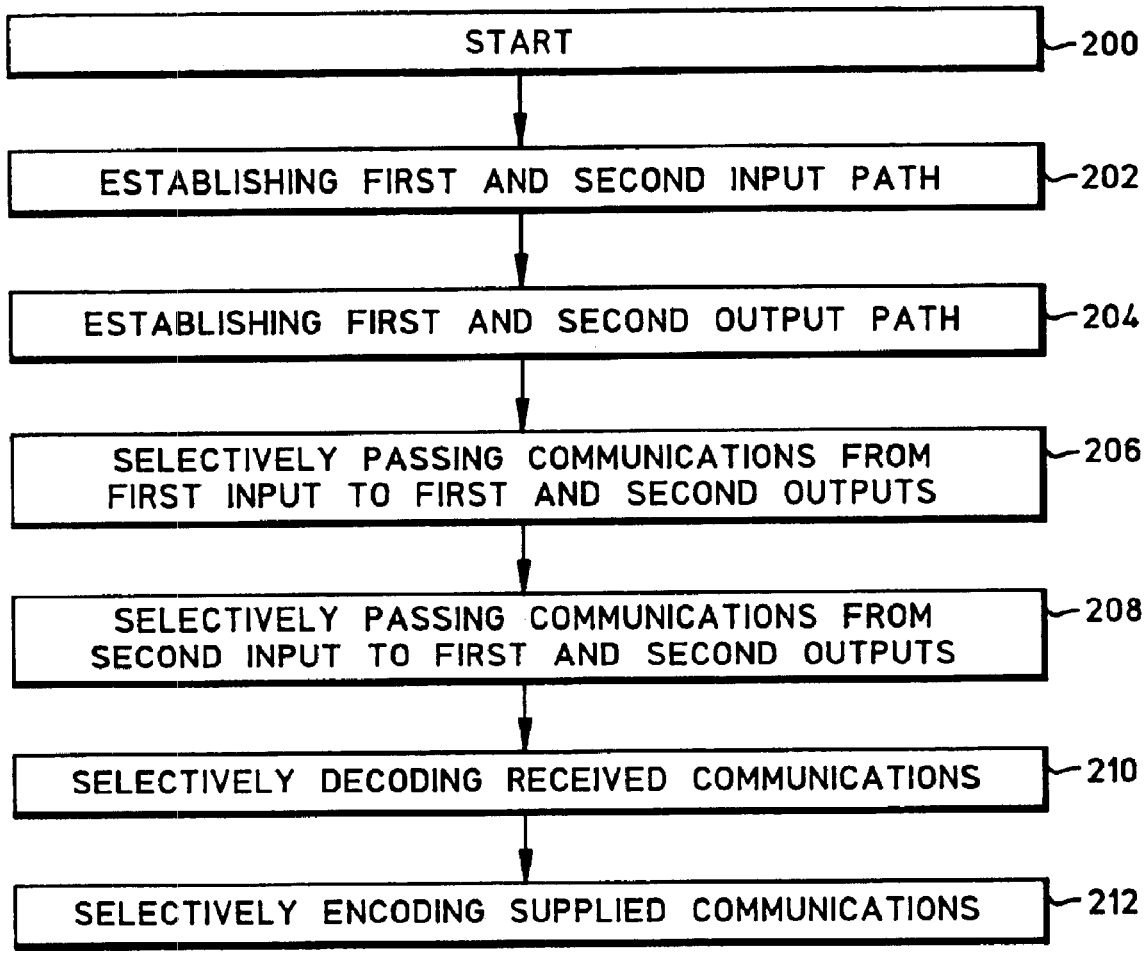
FIG. 14 is a flowchart depicting an alternate method for diagnostic multicast crossbar switching in an integrated circuit (IC) digital communication relay device.

FIG. 14 is a flowchart depicting a method for diagnostic multicast crossbar switching in an integrated circuit (IC) digital communication relay device. Although the method is depicted as a series of numbered steps for clarity, no order should be inferred unless explicitly stated. The method begins with Step 200. Step 202 establishes a first and second input path to receive communications. Step 204 establishes a first and second output path to supply communications. Step 206 selectively passes communications from the first input to the first and second outputs. Step 208 selectively passes communications from the second input to the first and second outputs. Step 210 selectively decodes received communications. Step 212 selectively encodes supplied communications.

In a first mode of operation, Step 210 decodes communications received at the first input, and supplies the decoded communications at the first output. Step 212 encodes communications received at the second input and supplies the encoded communications at the second output.

In a second mode of operation, Step 206 passes communications received at the first input to the first output. Step 208 passes communications received at the second input to the second output.

In a third mode of operation, Step 206 passes communications received at the first input to the second output. Step 208 passes communications received at the second input to the first output.

In a fourth mode of operation, Step 206 passes communications received at the first input to the second output and to the first output.

In a fifth mode of operation, Step 208 passes communications received at the second input to the second output and to the first output.

In a sixth mode of operation, Step 210 decodes communications received at the first input. Step 212 encodes the decoded communications. Step 204 supplies the encoded communications at the second output.

In a seventh mode of operation, Step 210 decodes communications received at the second input. Step 212 encodes the decoded communications. Step 208 supplies the encoded communications at the first output.

In an eighth mode of operation, Step 210 decodes communications received at the first input. Step 212 encodes the decoded communications. Step 208 supplies the encoded communications at the first output.

In a ninth mode of operation, Step 210 decodes communications received at the second input. Step 212 encodes the decoded communications. Step 208 supplies the encoded communications at the second output.

In a tenth mode of operation, Step 212 encodes communications received at the first input. Step 210 decodes the decoded communications. Step 208 supplies the encoded communications at the first output.

In an eleventh mode of operation, Step 212 encodes communications received at the second input. Step 210 encodes the decoded communications. Step 208 supplies the encoded communications at the second output.

In a twelfth mode of operation, Step 212 decodes communications received at the first input. Step 208 supplies decoded communications at the second output. Step 210 encodes the decoded communications. Step 208 also supplies the encoded communications at the first output.

In a thirteenth mode of operation, Step 210 encodes communications received at the first input. Step 208 supplies encoded communications at the second output. Step 212 decodes the encoded communications. Step 208 also supplies the decoded communications at the first output.

Figure 15:
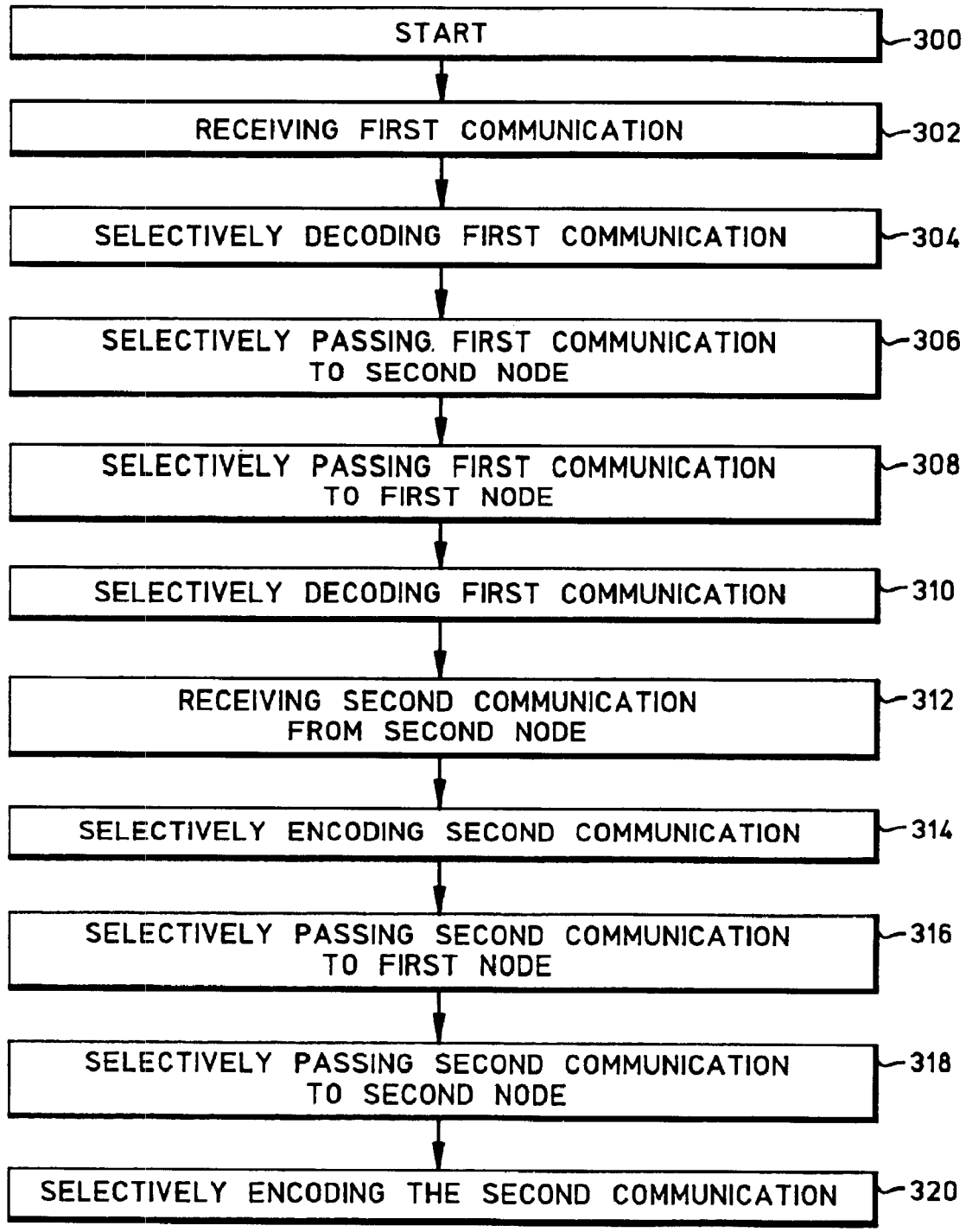
FIG. 15 is a flowchart depicting an alternate method for diagnostic multicast crossbar switching in an integrated circuit (IC) digital communication relay device.

FIG. 15 is a flowchart depicting an alternate method for diagnostic multicast crossbar switching in an integrated circuit (IC) digital communication relay device. The method begins with Step 300. Step 302 receives a first communication from a first node. A node is defined herein to be a communication partner transmitter or receiver. Step 304 selectively decodes the first communication and supplies it to a second node. Step 306 selectively passes the first communication to the second node. Step 308 selectively passes the first communication to the first node. Step 31 selectively decodes the first communication, encodes the first communication, and supplies the first communication to the first node.

In some aspects of the invention, Step 312 receives a second communication from the second node. Step 314 selectively encodes the second communication and supplies it to the first node. Step 316 selectively passes the second communication to the first node. Step 318 selectively passes the second communication to the second node. Step 320 selectively encodes the second communication, decodes the second communication, and supplies the second communication to the second node.

In some aspects of the invention, the device includes an encoder and a decoder having inputs and outputs, in which the first node has input and output ports, and in which the second node has input and output ports. Selectively decoding the first communication and supplying it to a second node in Step 304 includes connecting the first node output port to the decoder input and connecting the decoder output to the second node input port.

In some aspects, selectively passing the first communication to the second node in Step 306 includes connecting the first node output port to the second node input port.

In some aspects, selectively passing the first communication to the first node in Step 308 includes connecting the first node output port to the first node input port.

In some aspects of the invention, selectively decoding the first communication, encoding the first communication, and supplying the first communication to the first node in Step 310 includes connecting the first node output port to the decoder input, connecting the decoder output to the encoder input, and connecting the encoder output to the first node input port.

In some aspects, selectively encoding the second communication and supplying it to the first node in Step 314 includes connecting the second node output port to the encoder input and connecting the encoder output to the first node input port.

In some aspects of the invention, selectively passing the second communication to the first node in Step 316 includes connecting the second node output port to the first node input port.

In some aspects, selectively passing the second communication to the second node in Step 318 includes connecting the second node output port to the second node input port.

In some aspects, selectively encoding the second communication, decoding the second communication, and supplying the second communication to the second node in Step 320 includes connecting the second node output port to the encoder input, connecting the encoder output to the decoder input, and connecting the decoder output to the second node input port.

An IC relay and switching method have been presented that integrate diagnostic features and line monitoring support, to aid with switching decisions and network troubleshooting. This invention makes use of programmable features that allow the user to set the active data paths through the device and to monitor the possible data paths for integrity. In addition to this, it is possible to connect any input data path to any output data path while selectively bypassing the internal circuitry to aid in network diagnostics as well as board level debug operations. Examples of a few particular relay switch combinations have been presented above. Other combination are also possible. Further, although the mode commands have been depicted as being supplied from an external source, in some aspects of the invention, the modes of operation are responsive to internal monitoring. The status of the FEC data at the input ports on the device can be monitored for loss of signal, loss of clock, synchronization status (Loss of Frame and Out of Frame), and bit error rates (Signal Fail and Signal Degrade). In addition to this, several of the overhead bytes could also be used for switching purposes. The output ports are monitored for the presence of clock. The status of these monitored items are made available to a microprocessor interface where they can be read by an external source or used internally. Other variations and embodiments of the inventor will occur to those skilled in the art.

We claim:

1. A method for diagnostic multicast crossbar switching in an integrated circuit (IC) digital communication relay device, the method comprising:

establishing a first and second input path in a bidirectional line switch ring system to receive communications from the bidirectional line switch ring system;

establishing a first and second output path in the bidirectional line switch ring system to supply communications to the bidirectional line switch ring system;

selectively passing communications from the first input to the first and second outputs;

selectively passing communications from the second input to the first and second outputs;

selectively decoding received communications by a forward error correction coding (FEC) operation; and selectively encoding supplied communications by a FEC operation.

2. The method of claim 1 further comprising:

in a first mode of operation, decoding communications received at the first input, and supplying the decoded communications at the first output; and encoding communications received at the second input and supplying the encoded communications at the second output.

3. The method of claim 1 further comprising:

in a second mode of operation, passing communications received at the first input to the first output; and passing communications received at the second input to the second output.

4. The method of claim 1 further comprising:

in a third mode of operation, passing communications received at the first input to the second output; and passing communications received at the second input to the first output.

5. The method of claim 1 further comprising:

in a fourth mode of operation, passing communications received at the first input to the second output and to the first output.

6. The method of claim 1 further comprising:

in a fifth mode of operation, passing communications received at the second input to the second output and to the first output.

7. The method of claim 1 further comprising:

in a sixth mode of operation, decoding communications received at the first input;

encoding the decoded communications; and supplying the encoded communications at the second output.

8. The method of claim 1 further comprising:

in a seventh mode of operation, decoding communications received at the second input;

encoding the decoded communications; and supplying the encoded communications at the first output.

9. The method of claim 1 further comprising:

in an eighth mode of operation, decoding communications received at the first input;

encoding the decoded communications; and supplying the encoded communications at the first output.

10. The method of claim 1 further comprising:

in a ninth mode of operation, decoding communications received at the second input;

encoding the decoded communications; and supplying the encoded communications at the second output.

11. The method of claim 1 further comprising:

in a tenth mode of operation, encoding communications received at the first input;

decoding the encoded communications; and supplying the decoded communications at the first output.

12. The method of claim 1 further comprising:

in an eleventh mode of operation, encoding communications received at the second input;

decoding the encoded communications; and supplying the decoded communications at the second output.

13. The method of claim 1 further comprising:

in a twelfth mode of operation, decoding communications received at the first input;

supplying decoded communications at the second output;

encoding the decoded communications; and supplying the encoded communications at the first output.

14. The method of claim 1 further comprising:

in a thirteenth mode of operation, encoding communications received at the first input;

supplying encoded communications at the second output;

decoding the encoded communications; and supplying the decoded communications at the first output.

15. A method for diagnostic multicast crossbar switching in an integrated circuit (IC) digital communication relay device, the method comprising:

receiving a first communication from a first node in a bidirectional line switch ring system;

selectively decoding the first communication and supplying it to a second node in the bidirectional line switch ring system;

selectively passing the first communication to the second node;

selectively passing the first communication to the first node; and selectively decoding the first communication by a forward error correction coding (FEC) operation, encoding the first communication by a forward error correction coding (FEC) operation, and supplying the first communication to the first node.

16. The method of claim 15 further comprising:
receiving a second communication from the second node;
selectively encoding the second communication and supplying it to the first node;
selectively passing the second communication to the first node;
selectively passing the second communication to the second node; and
selectively encoding the second communication, decoding the second communication, and supplying the second communication to the second node.

17. The method of claim 16 in which the device includes an encoder and a decoder having inputs and outputs, in which the first node has input and output ports, and in which the second node has input and output ports; and
wherein selectively decoding the first communication and supplying it to a second node includes connecting the first node output port to the decoder input and connecting the decoder output to the second node input port.

18. The method of claim 17 wherein selectively passing the first communication to the second node includes connecting the first node output port to the second node input port.

19. The method of claim 18 wherein selectively passing the first communication to the first node includes connecting the first node output port to the first node input port.

20. The method of claim 19 wherein selectively decoding the first communication, encoding the first communication, and supplying the first communication to the first node includes connecting the first node output port to the decoder input, connecting the decoder output to the encoder input, and connecting the encoder output to the first node input port.

21. The method of claim 20 wherein selectively encoding the second communication and supplying it to the first node includes connecting the second node output port to the encoder input and connecting the encoder output to the first node input port.

22. The method of claim 21 wherein selectively passing the second communication to the first node includes connecting the second node output port to the first node input port.

23. The method of claim 22 wherein selectively passing the second communication to the second node includes connecting the second node output port to the second node input port.

24. The method of claim 23 wherein selectively encoding the second communication, decoding the second communication, and supplying the second communication to the second node includes connecting the second node output port to the encoder input, connecting the encoder output to the decoder input, and connecting the decoder output to the second node input port.

25. An integrated circuit (IC) digital communications relay device for diagnostic multicast crossbar switching, the device comprising:
a first input port;
a first output port;
a second input port;
a second output port;
a decoder for decoding and correcting forward error correction (FEC)-coded communications, the decoder having an input to accept said FEC-coded communications, the decoder having an output to supply FEC-decoded and forward error-corrected communications;
an encoder for FEC-coding communications, the encoder having an input, and the encoder having an output to supply FEC-coded communications; and
a switch system connected to the first and second input ports, the first and second output ports, the input and output of the decoder, and the input and output of the encoder, the switch system having an input to accept switching commands for selectively making connections among the first and second input ports, the first and second output ports, the input and output of the decoder, and the input and output of the encoder.

26. The device of claim 25 wherein the switch system accepts a first mode command and in response:
connects the first input port to the decoder input and the decoder output to the first output port; and
connects the second input port to the encoder input and the encoder output to the second output port.

27. The device of claim 25 wherein the switch system accepts a second mode command and in response:
connects the first input port to the first output port; and
connects the second input port to the second output port.

28. The device of claim 25 wherein the switch system accepts a third mode command and in response:
connects the first input port to the second output port; and
connects the second input port to the first output port.

29. The device of claim 25 wherein the switch system accepts a fourth mode command and in response:
connects the first input port to the second output port and to the first output port.

30. The device of claim 25 wherein the switch system accepts a fifth mode command and in response:
connects the second input port to the second output port and to the first output port.

31. The device of claim 25 wherein the switch system accepts a sixth mode command and in response:
connects the first input port to the decoder input;
connects the decoder output to the encoder input; and
connects the encoder output to the second output port.

32. The device of claim 25 wherein the switch system accepts a seventh mode command and in response:
connects the second input port to the decoder input;
connects the decoder output to the encoder input; and
connects the encoder output to the first output port.

33. The device of claim 25 wherein the switch system accepts an eighth mode command and in response:
connects the first input port to the decoder input;
connects the decoder output to the encoder input; and
connects the encoder output to the first output port.

34. The device of claim 25 wherein the switch system accepts a ninth mode command and in response:
connects the second input port to the decoder input;
connects the decoder output to the encoder input; and
connects the encoder output to the second output port.

35. The device of claim 25 wherein the switch system accepts a tenth mode command and in response:
connects the first input port to the encoder input;
connects the encoder output to the decoder input; and
connects the decoder output to the first output port.

36. The device of claim 25 wherein the switch system accepts an eleventh mode command and in response:
connects the second input port to the encoder input;
connects the encoder output to the decoder input; and
connects the decoder output to the second output port.

37. The device of claim 25 wherein the switch system accepts an twelfth mode command and in response:
   connects the first input port to the decoder input;
   connects the decoder output to the encoder input and to the second output port; and
   connects the encoder output to the first output port.

38. The device of claim 25 wherein the switch system accepts an thirteenth mode command and in response:
   connects the first input port to the encoder input;
   connects the encoder output to the decoder input and to the second output port; and
   connects the decoder output to the first output port.

* * * * *